United States Patent
Chen et al.

(10) Patent No.: US 10,802,337 B1
(45) Date of Patent: Oct. 13, 2020

(54) LOCAL DIMMING SYSTEM AND METHOD ADAPTABLE TO A BACKLIGHT OF A DISPLAY

(71) Applicant: HIMAX TECHNOLOGIES LIMITED, Tainan (TW)

(72) Inventors: Wu Feng Chen, Tainan (TW); Tsai Hsing Chen, Tainan (TW); Cheng-Che Tsai, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 16/424,357

(22) Filed: May 28, 2019

(51) Int. Cl.
*G02F 1/13357* (2006.01)
*G09G 3/36* (2006.01)
*H05B 45/10* (2020.01)
*H05B 45/37* (2020.01)

(52) U.S. Cl.
CPC .. *G02F 1/133603* (2013.01); *G02F 1/133606* (2013.01); *G09G 3/3648* (2013.01); *H05B 45/10* (2020.01); *H05B 45/37* (2020.01)

(58) Field of Classification Search
CPC ......... G02F 1/133603; G02F 1/133606; H05B 45/37; H05B 45/10; G09G 3/3648
See application file for complete search history.

(56) References Cited

U.S. PATENT DOCUMENTS

| | | | |
|---|---|---|---|
| 2011/0115826 A1* | 5/2011 | Fujiwara | G09G 3/3426 345/690 |
| 2012/0147062 A1* | 6/2012 | Seo | G09G 3/342 345/690 |
| 2016/0111047 A1* | 4/2016 | Yamato | G09G 3/3406 345/102 |

* cited by examiner

*Primary Examiner* — Charles V Hicks
(74) *Attorney, Agent, or Firm* — Donald E. Stout; Stout, Uxa & Buyan, LLP

(57) ABSTRACT

A local dimming system adaptable to a backlight of a display includes a light shape imitation (LSI) unit that receives a pulse-width modulation (PWM) value and provides a profile data for each block of the backlight; a profile analysis unit that generates an analytic mean value according to the profile data; and a diffusion compensation unit that compares the analytic mean value with a target mean value and compensates the PWM value for light diffusion according to a result of the comparison, thereby generating a compensated PWM value.

14 Claims, 5 Drawing Sheets

| 95.45% | 86.36% | 79.17% | 68.97% | 64.31% | 94.59% | 82.86% | 48.48% | 51.22% | 64.06% | 80.20% | 88.65% | 84.05% | 83.63% | 72.35% | 68.10% |
|---|---|---|---|---|---|---|---|---|---|---|---|---|---|---|---|
| 95.63% | 82.61% | 73.08% | 84.38% | 87.50% | 130.23% | 90.00% | 36.84% | 54.35% | 58.82% | 79.41% | 102.10% | 105.23% | 110.64% | 96.34% | 86.10% |
| 91.30% | 82.61% | 61.54% | 76.47% | 100.00% | 134.78% | 81.40% | 36.59% | 66.67% | 66.67% | 60.00% | 76.47% | 101.18% | 106.22% | 107.84% | 96.14% |
| 95.45% | 90.48% | 52.17% | 66.67% | 89.19% | 105.13% | 51.35% | 42.50% | 74.07% | 60.56% | 51.69% | 72.65% | 83.55% | 86.34% | 104.95% | 58.10% |
| 104.36% | 89.47% | 57.89% | 54.17% | 75.00% | 72.41% | 27.59% | 45.71% | 68.00% | 49.21% | 37.84% | 54.17% | 74.22% | 87.73% | 82.26% | 93.94% |
| 110.53% | 82.35% | 58.82% | 52.63% | 63.64% | 83.33% | 48.00% | 33.33% | 51.22% | 40.38% | 36.51% | 61.63% | 78.81% | 80.41% | 88.10% | 86.67% |
| 100.00% | 62.50% | 56.25% | 55.56% | 65.00% | 95.65% | 70.83% | 42.31% | 51.52% | 40.48% | 30.19% | 79.22% | 101.85% | 54.20% | 100.00% | 70.78% |
| 88.24% | 62.50% | 81.25% | 94.44% | 75.00% | 71.43% | 63.64% | 47.83% | 40.74% | 33.33% | 27.91% | 64.62% | 74.74% | 34.51% | 71.67% | 68.75% |

FIG. 5

LOCAL DIMMING SYSTEM AND METHOD ADAPTABLE TO A BACKLIGHT OF A DISPLAY

BACKGROUND OF THE INVENTION

1. Field of the Invention

The present invention generally relates to backlight dimming, and more particularly to a local dimming system and method adaptable to a light-emitting diode backlight of a liquid crystal display.

2. Description of Related Art

As liquid crystal displays (LCDs) do not produce light themselves, a backlight is required to provide illumination to the LCDs. The light source of the backlight may be composed of light-emitting diodes (LEDs).

In order to improve the contrast, a backlight dimming technique is adopted to dynamically control luminance of the backlight. Global dimming is one type of backlight dimming, in which luminance of entire display panel is controlled at the same time. The global dimming can substantially improve dynamic contrast between two consecutive frames. Local dimming is another type of backlight dimming, in which luminance of partial display panel within one frame is controlled. The local dimming can substantially improve static contrast.

Conventional dimming methods, particularly local dimming methods, suffer luminance unevenness and flickers. More importantly, conventional local dimming methods cannot effectively reduce power consumption. A need has arisen to propose a novel scheme to overcome disadvantages of conventional local dimming methods.

SUMMARY OF THE INVENTION

In view of the foregoing, it is an object of the embodiment of the present invention to provide a local dimming system and method adaptable to a light-emitting diode (LED) backlight of a liquid crystal display (LCD) capable of effectively compensating for light diffusion and substantially increasing a dynamic range.

According to one embodiment, a local dimming system adaptable to a backlight of a display includes a light shape imitation (LSI) unit, a profile analysis unit and a diffusion compensation unit. The LSI unit receives a pulse-width modulation (PWM) value and provides a profile data for each block of the backlight. The profile analysis unit generates an analytic mean value according to the profile data. The diffusion compensation unit compares the analytic mean value with a target mean value and compensates the PWM value for light diffusion according to a result of the comparison, thereby generating a compensated PWM value.

BRIEF DESCRIPTION OF THE DRAWINGS

FIG. 5 shows exemplary determined ratios associated with blocks of the backlight.

DETAILED DESCRIPTION OF THE INVENTION

Figure 1:
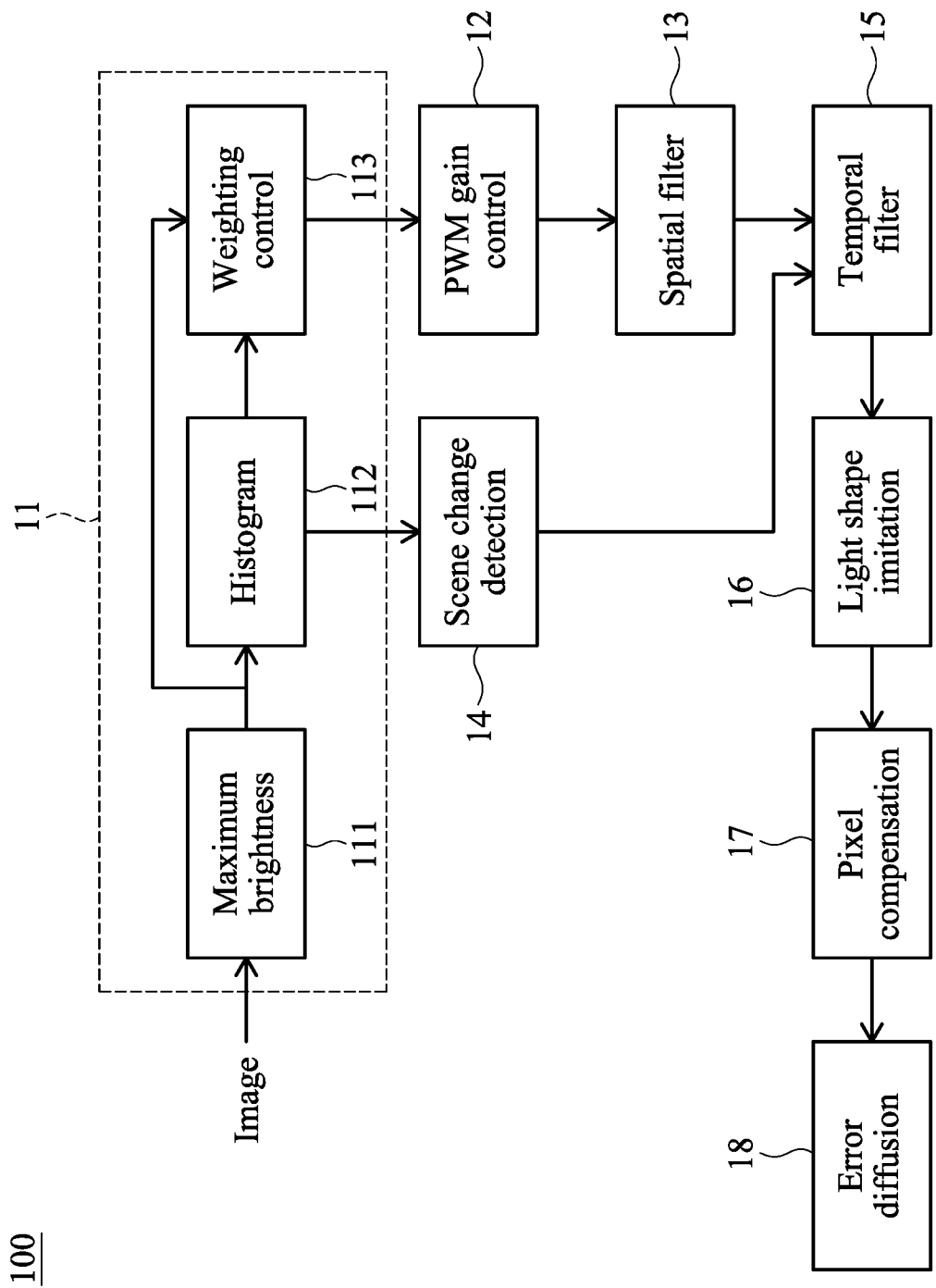
FIG. 1 shows a block diagram illustrating a local dimming system adaptable to a light-emitting diode (LED) backlight of a liquid crystal display (LCD)

FIG. 1 shows a block diagram illustrating a local dimming system 100 adaptable to a light-emitting diode (LED) backlight of a liquid crystal display (LCD) disclosed in a co-pending U.S. application Ser. No. 16/107,938, filed on Aug. 21, 2018 and entitled LOCAL DIMMING SYSTEM AND METHOD ADAPTABLE TO A BACKLIGHT OF A DISPLAY, assigned to the same assignee, the disclosure of which is incorporated herein by reference.

The local dimming system 100 may include a mean estimation unit 11 configured to receive an image and estimate a mean value thereof. The mean value may be estimated according to a histogram of the image. Specifically, the mean estimation unit 11 may include a maximum brightness unit 111 configured to determine maximum brightness of each pixel of the image regardless of colors (e.g., red, green and blue).

The mean estimation unit 11 may include a histogram unit 112 configured to generate a histogram mean value according to the histogram of the image. The mean estimation unit 11 may include a weighting control unit 113 configured to generate the mean value.

The local dimming system 100 may include a pulse-width modulation (PWM) gain control unit 12 configured to generate PWM gain value according to the mean value (from the mean estimation unit 11). The PWM gain value is used to control power supplied to the LED backlight. The larger the PWM gain value is, the higher the total power supplied to the LED backlight.

The local dimming system 100 may include a spatial filter 13 configured to be performed on the mean values in spatial domain to enhance the PWM gain values, thereby generating enhanced PWM gain values. The local dimming system 100 may include a scene change detection unit 14 configured to detect scene change according to the histogram mean value (from the histogram unit 112).

The local dimming system 100 may include a temporal filter 15 configured to be performed in temporal domain according to the enhanced PWM gain value (from the spatial filer 13) and a result of scene change detection (from the scene change detection unit 14) for the purpose of adjusting dimming speed and preventing flicker (i.e., flickerless), thereby generating PWM values.

The local dimming system 100 may include a light shape imitation (LSI) unit 16 configured to generate luminance gain according to the PWM value (from the temporal filter 15), and include a pixel compensation unit 17 configured to perform pixel compensation on the image according to the luminance gain (from the LSI unit 16), thereby resulting in a compensated image.

The local dimming system 100 may include an error diffusion unit 18 configured to perform error diffusion on the compensated image. The error diffusion may be performed by truncating at least one least significant bit (LSB), for example, truncating 14 bits to 12 bits, of the compensated image. Accordingly, contour effect may be substantially reduced to improve picture quality.

Figure 2:
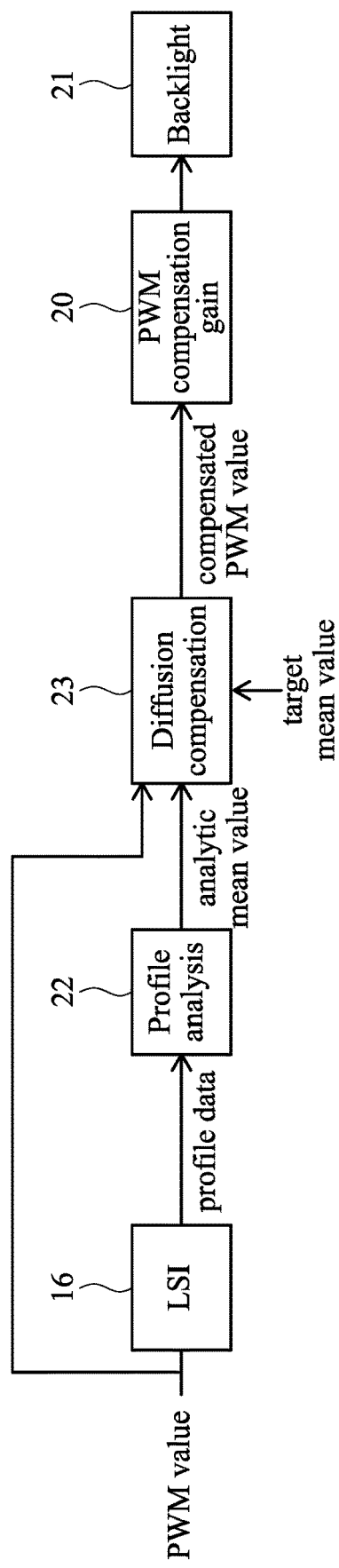
FIG. 2 shows a block diagram illustrating a local dimming system adaptable to a light-emitting diode (LED) backlight of a liquid crystal display (LCD) according to one embodiment of the present invention.
Figure 3:
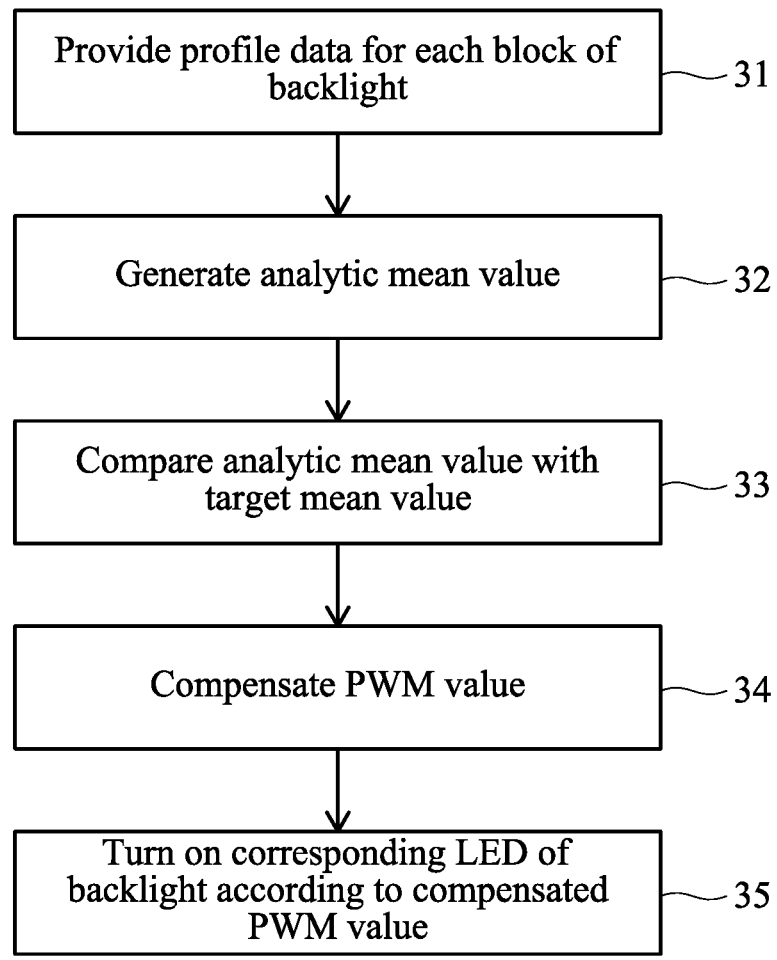
FIG. 3 shows a flow diagram illustrating a local dimming method adaptable to a light-emitting diode (LED) backlight of a liquid crystal display (LCD) according to one embodiment of the present invention.

FIG. 2 shows a block diagram illustrating a local dimming system 200 adaptable to a light-emitting diode (LED) backlight 21 of a liquid crystal display (LCD) according to one embodiment of the present invention. The blocks of the local dimming system 200 may be implemented by hardware (e.g., a digital image processor), software (e.g., computer programs) or their combinations. FIG. 3 shows a flow diagram illustrating a local dimming method 300 adaptable to a light-emitting diode (LED) backlight 21 of a liquid crystal display (LCD) according to one embodiment of the present invention.

Figure 4A:
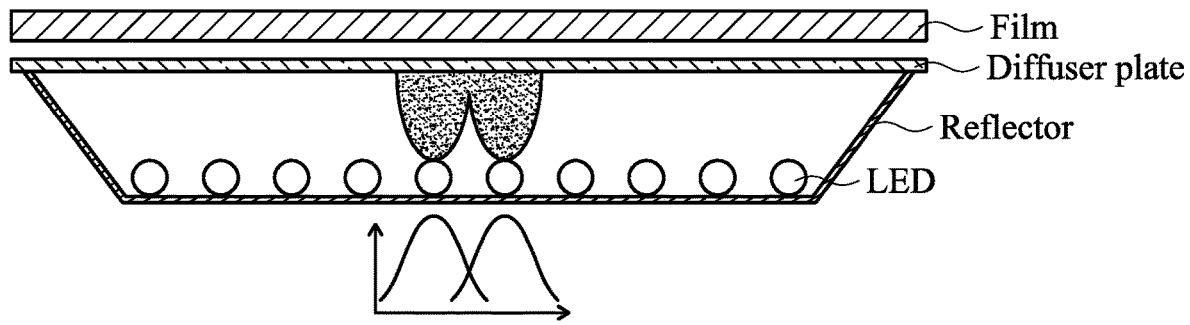
FIG. 4A schematically shows a cross-sectional view of the backlight of FIG. 2 and associated light diffusion curves of the LEDs of the backlight.
Figure 4B:
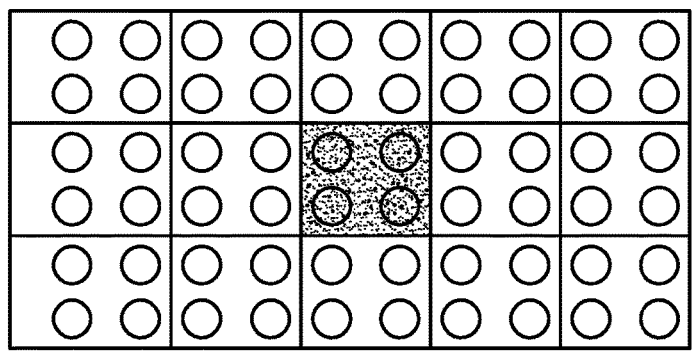
FIG. 4B shows a top view of a backlight illustrating a non-diffused light profile generated by a block of ideal LEDs.
Figure 4C:
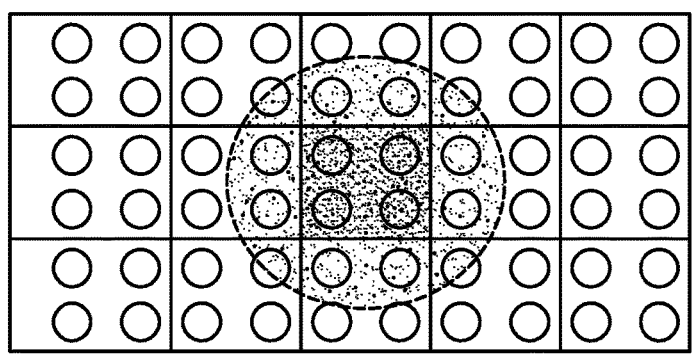
FIG. 4C shows a top view of the backlight of FIG. 2 illustrating a diffused light profile generated by a block of real LEDs.

As the light emitted by the LED is generally not collimated, a profile data representing illumination irradiated by one block (corresponding to one or more LEDs) of the backlight 21, may ordinarily diffuse or spread into neighbor blocks. As a result, a dynamic range of the image may be substantially reduced. For example, a bright spot is dim, while a dark spot is not dark sufficiently. FIG. 4A schematically shows a cross-sectional view of the backlight 21 of FIG. 2 and associated light diffusion curves of the LEDs of the backlight 21. FIG. 4B shows a top view of a backlight illustrating a non-diffused light profile generated by a block of ideal LEDs, and FIG. 4C shows a top view of the backlight 21 of FIG. 2 illustrating a diffused light profile generated by a block of real LEDs. The local dimming system 200 of FIG. 2 is capable of compensating for light diffusion caused by the real LEDs, thereby substantially increasing the dynamic range.

In the embodiment, the local dimming system 200 may include a light shape imitation (LSI) unit 16 that provides a profile data for each block of the backlight 21 (step 31). As described above in conjunction with FIG. 1, the LSI unit 16 is coupled to receive a pulse-width modulation (PWM) value (for example, from the temporal filter 15).

The local dimming system 200 may include a profile analysis unit 22 coupled to receive the profile data (from the LSI unit 16) and configured to generate an analytic mean value according to the profile data (step 32). The analytic mean value may be generated by a method being the same as or similar to the mean value generated by the mean estimation unit 11 or the enhanced PWM gain value generated by the spatial filter 13 in conjunction with FIG. 1 as disclosed specifically in the co-pending U.S. application as mentioned above.

The local dimming system 200 of the embodiment may include a diffusion compensation unit 23 configured to compare the analytic mean value with a target mean value (which may be derived from the image inputted to the local dimming system 200) (step 33), and to compensate the PWM value for light diffusion according to a result of the comparison (between the analytic mean value and the target mean value), thereby generating a compensated PWM value (step 34). Specifically, in the embodiment, a ratio of the target mean value to the analytic mean value (for a block of the backlight 21) is first determined, and the PWM value is then multiplied by the determined ratio (as PWM compensation gain) to generate the compensated PWM value. Finally, the compensated PWM value (from the diffusion compensation unit 23) is sent to a PWM compensation gain unit 20, which may controllably turn on the corresponding LED of the backlight 21 (step 35).

FIG. 5 shows exemplary determined ratios associated with blocks of the backlight 21. In this example, some PWM values are greatly increased by large ratios respectively in the blocks with slanted lines, while some PWM values are greatly reduced by small ratios respectively in the dotted blocks. Accordingly, the input image may be effectively compensated with enhanced dynamic range.

Although specific embodiments have been illustrated and described, it will be appreciated by those skilled in the art that various modifications may be made without departing from the scope of the present invention, which is intended to be limited solely by the appended claims.

What is claimed is:

1. A local dimming system adaptable to a backlight of a display, the system comprising:
   a light shape imitation (LSI) unit that receives a pulse-width modulation (PWM) value and provides a profile data for each block of the backlight, the profile data representing illumination irradiated by one of blocks of the backlight;
   a profile analysis unit that generates an analytic mean value according to the profile data; and
   a diffusion compensation unit that compares the analytic mean value with a target mean value and compensates the PWM value for light diffusion according to a result of the comparison, thereby generating a compensated PWM value;
   wherein the LSI unit multiplies a plurality of profile data by corresponding PWM values to obtain products of multiplication, which are then added to result in a light shape.

2. The system of claim 1, wherein the backlight comprises a light-emitting diode backlight.

3. The system of claim 1, wherein the display comprises a liquid crystal display.

4. The system of claim 1, wherein the target mean value is derived form an input image.

5. The system of claim 1, wherein the diffusion compensation unit compares the analytic mean value with the target mean value by determining a ratio of the target mean value to the analytic mean value.

6. The system of claim 5, wherein the diffusion compensation unit compensates the PWM value by multiplying the PWM value by the determined ratio to generate the compensated PWM value.

7. The system of claim 1, further comprising:
   a PWM compensation gain unit that receives the compensated PWM value, according to which the backlight is controllably turned on.

8. A local dimming method adaptable to a backlight of a display, the method comprising:
   receiving a pulse-width modulation (PWM) value and providing a profile data for each block of the backlight, the profile data representing illumination irradiated by one of blocks of the backlight;
   generating an analytic mean value according to the profile data;
   comparing the analytic mean value with a target mean value; and
   compensating the PWM value for light diffusion according to a result of the comparison, thereby generating a compensated PWM value.

9. The method of claim 8, wherein the backlight comprises a light-emitting diode backlight.

10. The method of claim 8, wherein the display comprises a liquid crystal display.

11. The method of claim 8, wherein the target mean value is derived form an input image.

12. The method of claim 8, wherein the analytic mean value is compared with the target mean value by determining a ratio of the target mean value to the analytic mean value.

13. The method of claim 12, wherein the PWM value is compensated by multiplying the PWM value by the determined ratio to generate the compensated PWM value.

14. The method of claim 8, further comprising:
   controllably turning on the backlight according to the compensated PWM value.

\* \* \* \* \*